26. In a convertible walking and riding cultivator, having a driver's seat, the combination of the main frame, the plow-frame depending from and secured in fixed vertical relations to the main frame, the plow-beam pivotally connected to the plow-frame, the wheel-frame adjustable to either of two operative positions longitudinally of the plow-beam, a lever connected to the plow-beam in rear of its front end for lifting it, a lever for moving the wheel-frame and the plow-beam relatively to each other longitudinally of the machine, and means for holding the lifting-lever in fixed position as to the depending plow-frame when the said longitudinal adjustment is being effected, substantially as set forth.

27. In a convertible walking and riding cultivator, having a driver's seat, the combination of the main frame, the plow-beam pivotally connected thereto, supporting-wheels and wheel-carriers movable from a rear position to a forward position, means for sustaining the rear end of the beam capable of a series of adjustments and adapted while under one adjustment to sustain the beam in the same position irrespective of whether the wheels are in their rear position or in their forward position, and a mechanical device supported by the main frame and connected with both of said wheels for effecting the adjustment of the wheels from the one to the other of the said positions, substantially as set forth.

28. In a convertible walking and riding cultivator, having a driver's seat, the combination of the main frame, the plow-beams, the pivots between the beams and the main frame, the beam-sustaining means on the main frame for holding the rear ends of the beams, the wheels and wheel-carrier adjustable from a rear position to a forward position, means for positively holding the wheels and wheel-carrier in both of said positions alternately to prevent accidental return thereof from either position to the other, and devices for locking the beam-sustaining means relatively to the horizontal planes of the main frame to insure that, in one adjustment of said locking devices, the beams shall be held in the same horizontal positions whether the wheels are in their forward position or rear position, substantially as set forth.

29. In a convertible walking and riding cultivator, having a driver's seat, the combination of the main frame, the plow-beams, the pivots interposed between the beams and the main frame, the supporting-wheels, the simultaneously-vibrating crank-arms for the wheels mounted on an axis and adapted to swing from a plane inclined rearward from the vertical plane of the axis to a plane of substantially equal inclination forward from said vertical plane, a lever connected with both of said wheels for applying power to move the wheels from the rear position to the forward position, means for sustaining the rear end of the plow-beam from the main frame, and devices for holding the said beam-sustaining means in one position irrespective of the positions to which the wheels are adjusted, substantially as set forth.

30. In a convertible walking and riding cultivator, having a driver's seat, the combination of the main frame, the plow-beam pivotally connected to the main frame, ground-wheels and wheel-carriers movable from a rear operative position past a central neutral position to a forward operative position, and a mechanical device substantially as described connected with both of said wheels for moving the wheels from one operative position to the other and adapted to automatically carry the wheels from their central position to either of the aforesaid extreme positions after being brought to the said central position by the application of power.

31. In a convertible walking and riding cultivator, having a driver's seat, the combination of the main frame, the plow-beam pivotally connected thereto, supporting-wheels and wheel-carriers movable from a rear operative position past a central position to a forward operative position, means for sustaining the rear ends of the beams and adapted to be held in one position and therefrom sustain the beam in the same relation to the ground both in the forward position of the wheels and in the rear position of the wheels, and a mechanical device substantially as described connected with both of said wheels for moving the wheels from one position to the other and adapted to automatically carry the wheels from their central position to either of the extreme positions, substantially as set forth.

32. In a convertible walking and riding cultivator, having a driver's seat, the combination of the main frame, the beam, and three beam-sustaining devices interposed between the beam and the main frame, to wit, a pivotal connecting device for the front end of the beam, second, a beam-lifting spring, and, third, a beam-lifting and hand-adjusting device for the rear end of the beam, the ground-wheels and wheel-carriers movable from a rear position to a forward position, and mechanical devices substantially as described, for moving the wheels from one position to the other, and permitting the said three beam-sustaining devices to all occupy the same positions whether the wheels are in their forward position or in their rear position, substantially as set forth.

33. In a convertible walking and riding cultivator, having a driver's seat, the combination of the main frame, the plow-carrying frame depending from the main frame and having plow-spindles turned inward from its vertical bars, and the wheel-carrying frame depending from the main frame, and having spindles turned outward from its vertical bars, mechanical devices for relatively adjusting the wheel-spindles and the plow-spindles toward and from each other, and means

UNITED STATES PATENT OFFICE.

ADOLPH BERNSTEIN, OF NEW YORK, N. Y.

WAISTBAND.

SPECIFICATION forming part of Letters Patent No. 694,820, dated March 4, 1902.

Application filed October 5, 1901. Serial No. 77,712. (No model.)

*To all whom it may concern:*

Be it known that I, ADOLPH BERNSTEIN, a citizen of the United States, residing at Manhattan borough, New York city, in the county of and State of New York, have invented new and useful Improvements in Waistbands, of which the following is a specification.

This invention relates to a waistband suitable for application to such garments as knee-pants or boys' wear or other apparel; and the invention resides in the novel features of construction set forth in the following specification and claims and illustrated in the annexed drawings, in which—

Figure 1 is a face elevation of the band. Fig. 2 is a section along $xx$, Fig. 1. Fig. 3 is a section along $yy$, Fig. 1. Fig. 4 shows a modification.

In the drawings are shown a number or series of strips $a$, bound together to form buttonholes. The bindings are shown at $b$ and $c$. The strips abut, or nearly so, but the edges of the strips not being connected the split or adjacent edges have between them a space $d$, forming a buttonhole. In other words, the adjacent edges of a pair of strips form the sides of a buttonhole and the closures or bindings $b$ and $c$ close or form the ends of such hole. The edges or sides of a buttonhole could be left raw or unfinished or stitched, or the ends of each strip could be doubled or slightly bent over to round or finish the sides of the hole.

The device is combined or provided with a lining $b'$, forming a fastening or means for attaching the band to a garment or waist portion of a pair of trousers. A simple way of forming this lining or backing is to take the strip or binding $b$ of sufficient width to both bind an edge of strips $a$ and also to depend or lie along a face of the strips to form the required lining. The lining, however, could be a piece separate from the bindings, if so desired. The construction of an extended binding or of the lining integral with a binding has, however, been found satisfactory. Stitches $e$ connect the strips to the lining or, rather, to an intermediate part of the lining, so as to leave the edges, or at least the lower edge, of the lining clear for being sewed or attached to a garment. These stitches are non-rectilinear. The zigzag or herring-bone stitch has been found suitable, although other lines of stitching, such as wavy or not on a straight line can be employed. This non-rectilinear stitch-line effects several results. It causes the lining to lie smooth or close to the strips. Such stitch-line can also be made to form an apex or angle which lies at and forms a reinforcement at an end portion of the buttonhole, and such stitch-line, which converges from opposite sides to a buttonhole, forms a tapering cavity or a pocket or guide directing the finger to slip into or easily find the buttonhole in dressing or undressing.

A rubber or elastic loop $f$ can be secured at each buttonhole $b$. A convenient way is to lap a binding over the ends of the loop, so that the loop is secured by the binding-stitches; but a staple or other fastening can be used for the loop, with or without stitches. The loop or its bight does not extend or lie clean up to the end of the buttonhole, and the hole and loop being both made to receive a button the stretch of the loop is limited by the play of the button in the buttonhole—that is, the loop under strain can stretch for the button to move or play back and forth in the hole; but as the button cannot pass beyond the end of the hole the pull or strain on the loop cannot stretch or strain the latter to such extent as to cause tearing or breakage.

An extension which is elastic or can stretch can be applied to the device. This extension is shown at $g$ and is doubled or drawn to folded condition by an elastic or rubber bands $h$. The elastics are shown secured to the extension by stitches $i$ and $k$, and the ends of the elastics can be tucked or concealed in folds of the extension-tape $g$. The elastics are secured exclusively to the extensions or free from the waistband, so that as the extensions are applied to or detached from the band the elastics accompany or remain properly attached to the extension. The free edge of the extension being suitably sewed to a garment or pair of trousers, a strain will cause the rubbers $h$ to stretch and the extension to straighten or lengthen. On the strain being stopped or reduced the elastics contract and restore the extension to folded or short condition. This elastic strip can be used in confront end, said coupling being movable independently of the shovel-beam, substantially as set forth.

59. The combination of the shovel-beam pivotally connected to its support at the front end, and pivotally connected to the shovel-standard at its rear end, and the connecting-link $q$ pivotally connected to the shovel-standards at the rear, and the laterally-adjustable holder for said link at the front end of the beam independent of the said beam, substantially as set forth.

60. The combination with the shovel-beam, its horizontal pivot or spindle $d^2$, the standards, and the pivotal connection between the beam and the standards, of the parallel link adjustable laterally independently of the beam, substantially as set forth.

In testimony whereof I affix my signature in presence of two witnesses.

ROBERT H. AVERY.

Witnesses:
G. F. CARSON,
W. S. COE.